United States Patent

Hua

[11] Patent Number: 5,803,794
[45] Date of Patent: Sep. 8, 1998

[54] COMBINED GRINDING MACHINE FOR PROVIDING AN INTERNAL SPLINE

[76] Inventor: Xu Xian Hua, Tiexi Qu, Fugong Er Jie, 6-223, Shenyang City 110024, China

[21] Appl. No.: 193,503

[22] Filed: Feb. 7, 1994

[30] Foreign Application Priority Data

Feb. 8, 1993 [CN] China .................................. 93227249.5

[51] Int. Cl.⁶ ..................................................... B24B 49/00
[52] U.S. Cl. .............................. 451/24; 451/180; 451/61; 451/65; 451/27; 451/151; 451/156
[58] Field of Search .................................. 51/281 P, 73 R; 451/180, 195, 65, 61, 27, 151, 156, 9, 10, 11, 24, 28

[56] References Cited

U.S. PATENT DOCUMENTS

| | | | |
|---|---|---|---|
| 3,924,355 | 12/1975 | Tatsumi et al. | 451/65 |
| 4,187,644 | 2/1980 | Fitzpatrick | 451/151 |
| 4,461,121 | 7/1984 | Motzer et al. | 451/65 |
| 4,590,712 | 5/1986 | Sugiyama et al. | 451/180 |
| 4,753,044 | 6/1988 | Bula | 451/65 |
| 5,095,662 | 3/1992 | Grimm et al. | 51/281 P |
| 5,283,938 | 2/1994 | Jones | 51/281 P |

FOREIGN PATENT DOCUMENTS 88216959.9  7/1989  China .

*Primary Examiner*—Eileen P. Morgan
*Attorney, Agent, or Firm*—Collier, Shannon, Rill & Scott, PLLC

[57] ABSTRACT

The combined grinding machine for internal spline includes three grinding heads for processing a bore of internal spline parts. The machine clamps a workpiece and at the same time can finish grind during the bore and spline operation and boring one of its end faces. The machine has a grinding head for boring and grinding head for a side boring a spline installed in a main sliding plate which moves on a vertical shaft of the machine body. The machine has a rotary table installed in a removable working table driven by a motor unit. Both the working table and the grinding head for the spline end face are located in the machine body. The machine demonstrates high efficiency, high precision, and low equipment investment. The machine saves time for aligning and clamping procedures.

8 Claims, 3 Drawing Sheets

1

COMBINED GRINDING MACHINE FOR PROVIDING AN INTERNAL SPLINE

BACKGROUND OF THE INVENTION

1. Field of the Invention

The invention relates to grinders. Specifically, the invention relates to a combined grinder for providing complete grinding of three separate surfaces of a bored, ground spline workpiece.

2. Description of the Background Art

This invention is an improvement of the device of Chinese Patent CN88216959.9 entitled "Spline Side Grinder For Internal Spline", herein incorporated by reference. Typically, machines used in the art only process one side of a spline workpiece. A high precision part requires grinding of the bore, its end face, and the side of the internal spline. Such machines require three grinders or grinding procedures with three clamping and dismantling procedures for one workpiece. Such machines result in low efficiency, high equipment investment, large area requirements and unstable quality control of the processed parts.

SUMMARY OF THE INVENTION

The invention is a combined grinder for grinding a workpiece, namely, a bore surface, an end surface, and a side surface of a workpiece to form internal splines on the inner circumference of the bore, with a single clamping operation to fix the workpiece to the grinding machine. By clamping the piece once and performing all three grinding operations in one clamp positioning, an internal spline can be bored and ground into the workpiece with good quality control, high efficiency, and low clamping deviation. The invention includes a machine body 10, a vertical column 80, an indexing rotary table 20 and three grinding heads (end grinding head 30; bore grinding head 40; and spline side grinding head 60). The vertical column 80 has vertical slides 70 and 110. Two grinding heads, one for grinding the bore 40 and a second for grinding the internal side surfaces of the internal bore of the spline 60 are attached to vertical slides 70 and 110. A safety locking mechanism 50 is installed in the vertical column 80 for the bore and internal side grinding heads 40 and 60. The third grinding head, the end grinding head 30, is attached to the machine body 10 for grinding the top surface of the spline. The invention has a grinding head 40 for boring and grinding head for a side of the bored spline 60 installed in a main sliding plate 90. The main sliding plate 90 moves on the vertical shaft of the machine body by a sliding means or vertical slides 70 and 110. A locking mechanism 50 is installed in the sliding plate 90. The invention includes a grinding head 30 for the spline end face, a working table 130 in the machine body 10, a rotary table 20 with clamping positioner 120 and a rotating mechanism in the working table, and a driving unit 140 comprising of a hydraulic oil cylinder or a servo motor in the one end of the working table.

The purposes of the invention are achieved by mounting the bore grinding head 40 and the internal spline grinding head 60 on a main sliding plate 90 which is, in turn, mounted on the vertical shaft 80 of the machine body 10 by slide ways or other appropriate sliding means 70 and 110. A locking mechanism 50 is installed in the main sliding plate 90. An end face grinding head 30 and a working table 130 are mounted in the body 10. A rotary table 20 with clamping positioner 120 and rotating mechanism are also installed in the working table 130. A driving unit 140 comprising a hydraulic cylinder, servo motor, or any other appropriate driving means, is mounted in one end of working table 130. A workpiece that is to be bored to form an internal spline in the workpiece is fixed on the rotary table 20 by clamp positioner 120 and rotary mechanism. At this point, the workpiece is oriented vertically in the machine body 10 and, in particular, is mounted in rotary table 20 and attached to working table 130. The top end face of the workpiece is ground by end grinding head 30 this is accomplished by lowering the end grinding head 30 into engagement with workpiece 1. After the grinding of the end face 4, the bore grinding head 40 is lowered into contact with the workpiece 1 to grind bore 2. Finally, the internal sides of the bore are ground to form an internal spline 3 in the workpiece 1 with spline side grinding head 60. This is accomplished by moving the working table 130 using driving unit 140 to align bore 2 of workpiece 1 mounted on rotary table 20 with the spline side grinding head 60. The grinding head 60 is then lowered into engagement with the workpiece 1 to perform the grinding operation. All three grinding operations are accomplished with one clamping operation. The time saved for clamping and aligning the workpiece 1 solves the problem of misalignment of the inside and outside diameters of the workpiece 1 that can be caused by repeated clamping of the workpiece. In addition, the invention works with higher efficiency and precision than prior known operations.

DETAILED DESCRIPTION OF THE INVENTION

Figure 1:
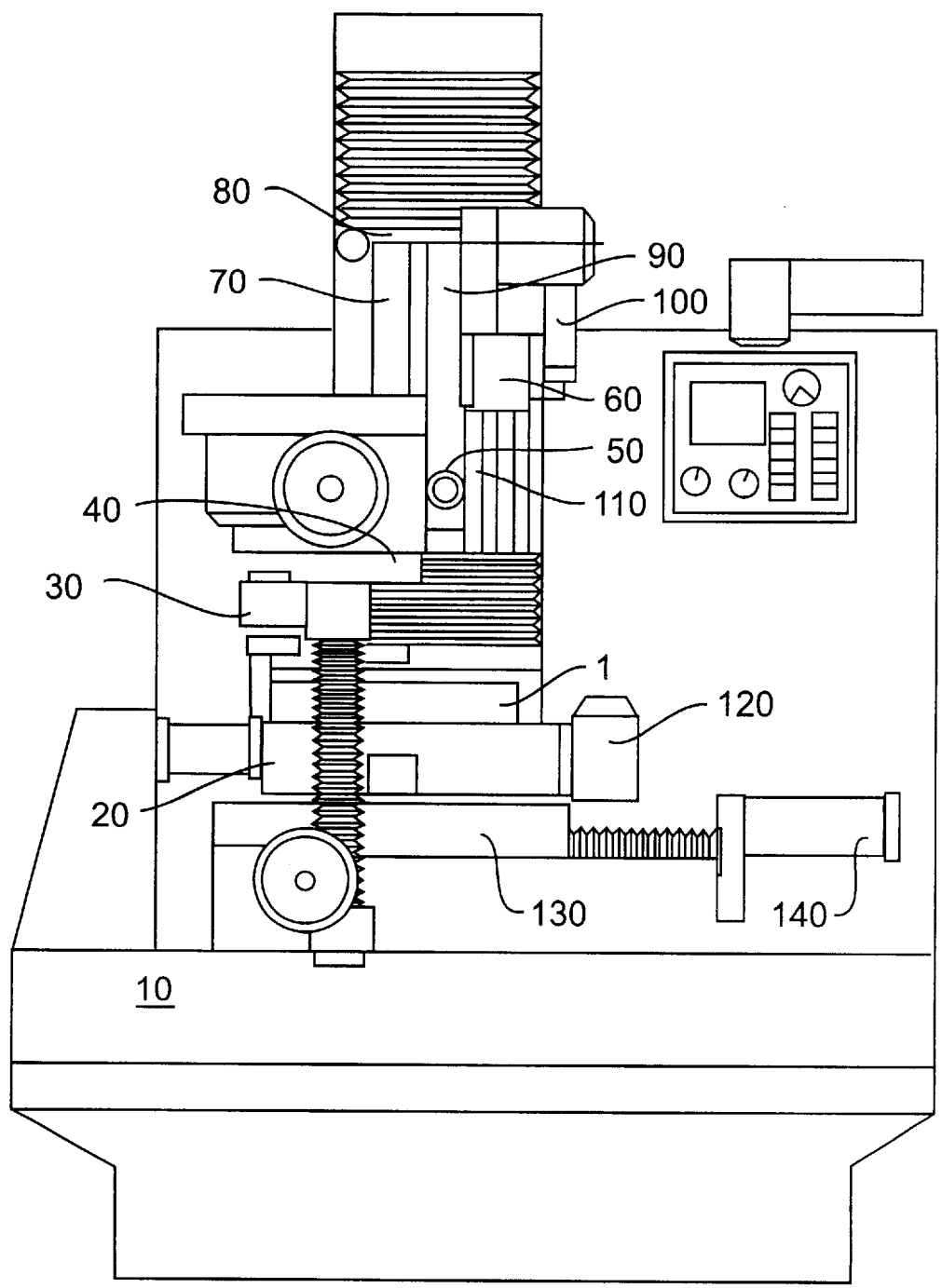
FIG. 1 is a front view of the combined grinding machine for providing an internal spline.

The invention is a combined grinder for providing an internal spline. The combined grinder finishes the grinding work of a bore 2, its end face 4, and a side of an internal spline 3 with one clamping procedure for the workpiece. The result is a quality end product that is produced with high efficiency and low clamping deviation.

The invention has a grinding head for boring 40 and a grinding head for the side spline of the bore 60. Bore grinding head 40 and spline side grinding head 60 are installed on the main sliding plate 90 in vertical shaft column 80 of the machine body 10 by slide ways or sliding means 70 and 110. A locking mechanism 50 is installed in the main sliding plate 90. An end face grinding head 30 and a working table 130 are included in the machine body 10. A rotary table 20 with a clamping positioner and a rotating mechanism 120 is provided in the working table. A driving unit 140 comprising of a hydraulic oil cylinder or a servo motor is located in one end of the working table. Clamping mechanism 50 and driving cylinder 100 push bore grinding head 40 and spline side grinding head 60 into working position. The workpiece is fixed on the rotary table 20, ground at one end of its faces, and then bored on the side to provide a spline. The entire operation requires only one clamping procedure. The single clamping and aligning procedure saves time and maintains a close tolerance for the workpiece's inside and outside diameters that would otherwise be diminished with two ore more clamping and positioning procedures.

A detailed description of the invention is provided by the Figures. FIG. 1 is a front view of the invention and FIG. 2 is a side view of the invention.

Figure 2:
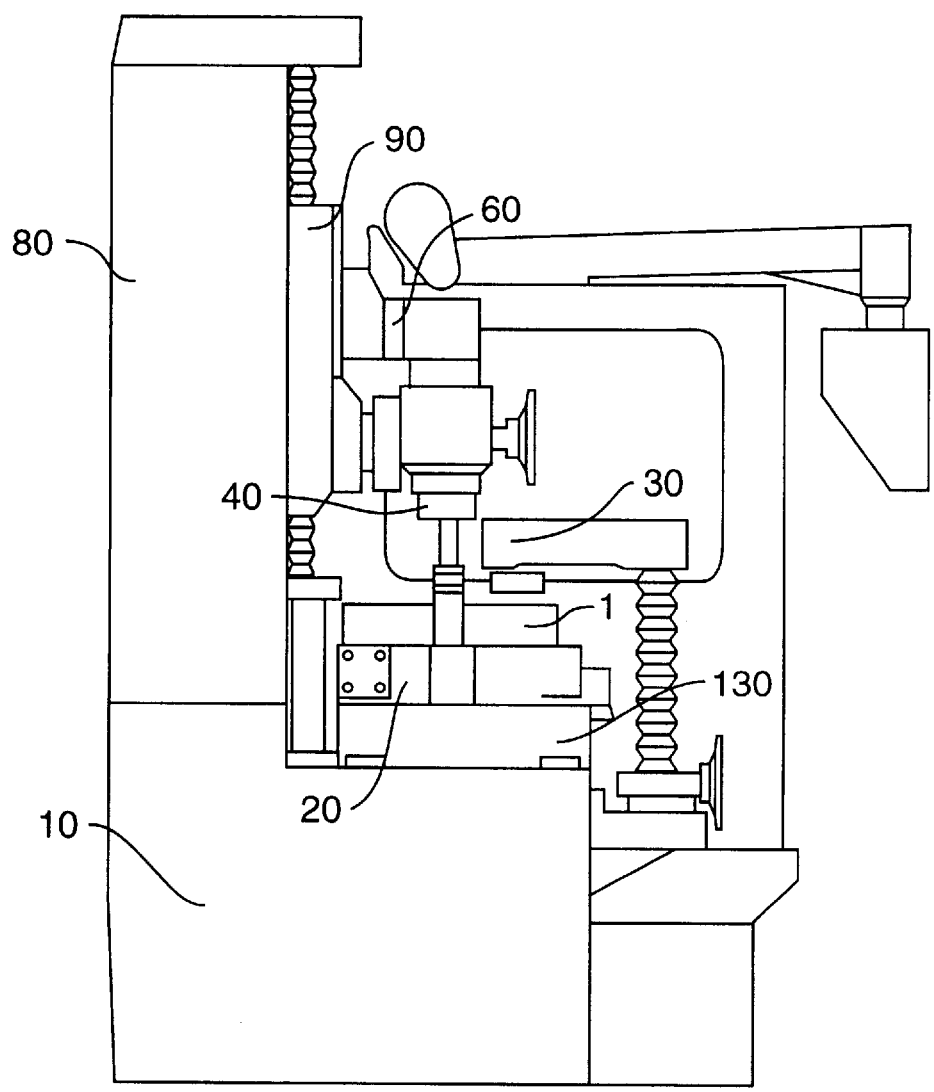
FIG. 2 is a side view of the combined grinding machine.
Figure 3B:
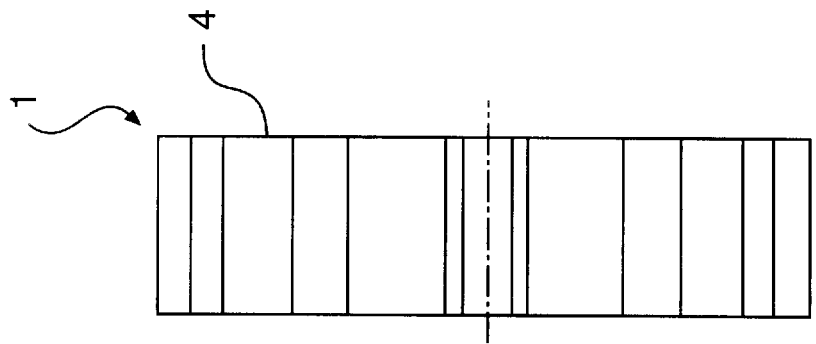
FIG. 3b is a side view, of a workpiece.
Figure 3A:
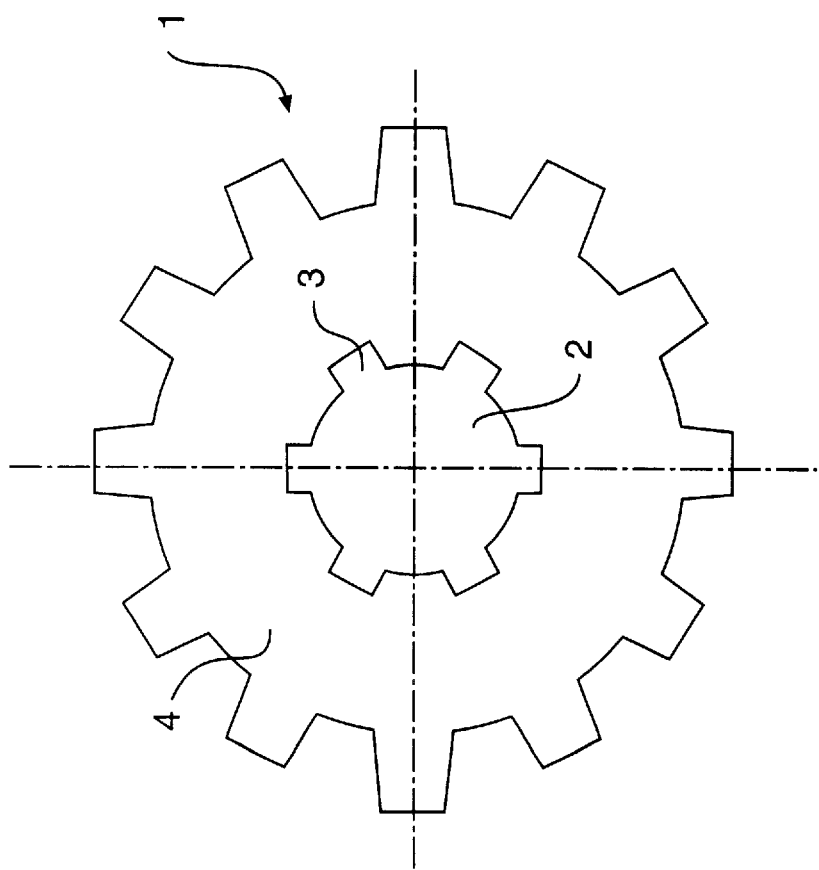
FIG. 3a is a plan view.

FIGS. 1 and FIG. 2 illustrate the installation of the main sliding plate 90 with a means for boring or a bore a grinding head 40 and a means for spline side grinding or spline side head 60 in vertical shaft 80 of a machine body 10 by sliding means 70 and 110. A locking or clamping mechanism 50 is installed in the main sliding plate 90. An end grinding head 30 and a working table 130 are provided in the machine body 10. The rotary table 20 with a clamping positioner and a rotating mechanism 120 is positioned in the working table 130. A driving unit 140 comprising a hydraulic oil cylinder or a servo motor is located in one end of the working table 130. The clamping mechanism 50 and a driving cylinder 100 push the bore grinding head 40 and the spline side grinding head 60 to a working position. The driving unit 140 forces the working table 130 to work in three positions: a first position for clamping a workpiece; a second position for grinding a side spline in a bore and one end face; and a third position for grinding a bore.

A single clamping procedure for three faces provides a geometrically precise boring machine that also has the following characteristics: high processing precision; good dimension consistency in producing parts; time savings for clamping and aligning procedures; and high production efficiency.

I claim:

1. A grinder for performing multiple grinding operations on single workpiece:
   a machine body;
   a vertical shaft connected to said machine body;
   a working table connected to said machine body;
   a rotary table secured to said working table, said rotary table having a clamping positioner for securing the workpiece to said grinder on said rotary table, said rotary table being capable of horizontal movement, said rotary table having a driving unit located on one end thereof for controlling the operation of said rotary table;
   a first grinding head for grinding an end face of the workpiece, said first grinding head being movably mounted on said machine body;
   a second grinding head for grinding a bore in the workpiece, said second grinding head being movably mounted on said vertical shaft; and,
   a third grinding head for grinding a spline in the bore of the workpiece, said third grinding head being movably mounted on said vertical shaft,
   wherein said grinder permitting grinding of the end face, the bore and the spline of the workpiece while requiring only a single clamping operation to secure the workpiece to the rotary table.

2. The grinder according to claim 1, further comprising:
   a main sliding plate movable mounted to said vertical shaft.

3. The grinder according to claim 2, wherein said second grinding head is mounted to said main sliding plate.

4. The grinder according to claim 2, wherein said third grinding head is mounted to said main sliding plate.

5. The grinder of claim 1 wherein said driving unit is a hydraulic oil cylinder.

6. The grinder of claim 1 wherein said driving unit is a servo motor.

7. A method of grinding a workpiece with a grinder having a machine body, a vertical shaft connected to said machine body, a working table connected to said machine body, a rotary table secured to said working table, said rotary table having a clamping positioner for securing the workpiece to said grinder on said rotary table, said rotary table being capable of horizontal movement, said rotary table having a driving unit located on one end thereof for controlling the operation of said rotary table, a first grinding head for grinding an end face of the workpiece, said first grinding head being movably mounted on said machine body, a second grinding head for grinding a bore in the workpiece, said second grinding head being movably mounted on said vertical shaft, and, a third grinding head for grinding a spline in the bore of the workpiece, said third grinding head being movably mounted on said vertical shaft, said method comprising the steps of:
   securing the workpiece to the rotary table;
   performing a first grinding operation using the first grinding head for grinding the end face of the workpiece;
   performing a second grinding operation using the second grinding head for grinding the bore in the workpiece;
   performing a third grinding operation using the third grinding head for grinding at least one spline in the bore of the workpiece; and
   removing the workpiece from the rotary table.

8. The method grinding according to claim 7, wherein said step of performing a third grinding operation further comprising the steps of:
   moving the workpiece into alignment with the third grinding head; and
   inserting the third grinding head into the bore.

* * * * *